Feb. 10, 1931.  A. O. JENSEN  1,792,307
CHRISTMAS TREE SUPPORT
Filed Sept. 24, 1929
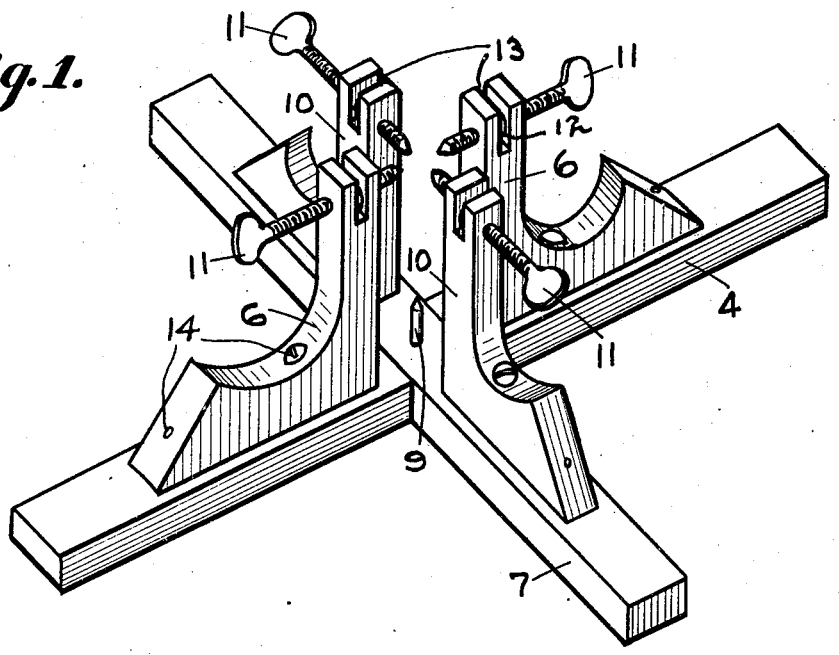
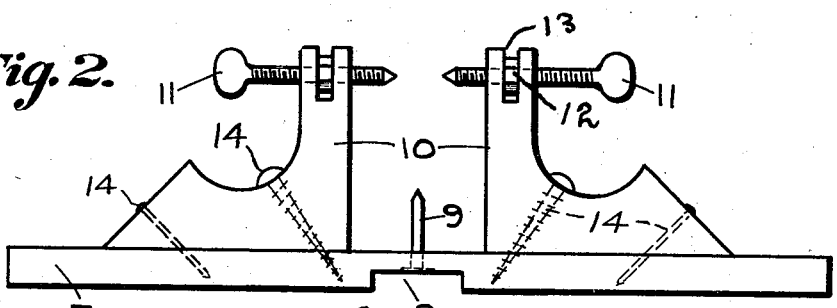
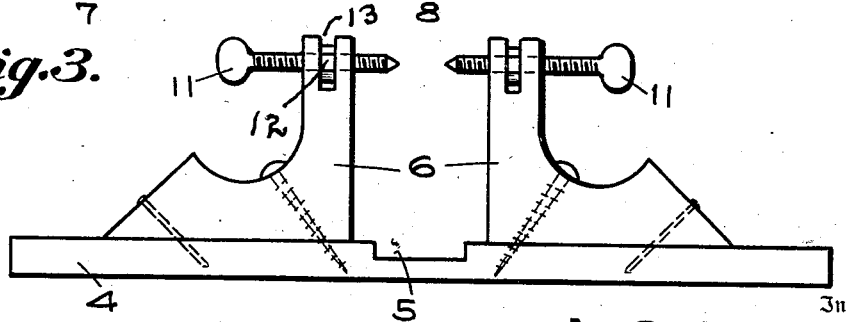
Inventor
A. O. Jensen
By
Hiram A. Sturgis
Attorney Patented Feb. 10, 1931

1,792,307

UNITED STATES PATENT OFFICE

ALBERT O. JENSEN, OF OMAHA, NEBRASKA

CHRISTMAS-TREE SUPPORT

Application filed September 24, 1929. Serial No. 394,766.

This invention relates to a holder or support for Christmas trees, and has for its object, broadly, to provide a device having a base of ample area for supporting the tree in an upright position, will be provided with adjustable-members for gripping the bodies of large or small trees and those having rough or irregular end-portions in a manner to prevent undue vibration, said device to be of such simple construction that it may be manufactured conveniently and at a limited expense.

The invention includes a pair of ornamental bars adapted to be laid crosswise when used and of such arrangement that they will be maintained at right angles without the use of nails, screws or other keepers, this being a matter of convenience when assembling them to form a base and when separating them.

By use of the cross-bars mentioned a base may be readily formed which will firmly support the tree, and when separated they will occupy a very limited space.

With the foregoing objects in view the invention presents a new and useful construction, combination and arrangement of parts as described herein and claimed, and as illustrated in the accompanying drawing, wherein,—

Fig. 1 is a perspective view showing the parts when assembled. Fig. 2 is a side view of a base-bar. Fig. 3 is a side view of a second base-bar.

Referring now to the drawing for a more particular description, I provide a base-bar 4 having a recess 5 formed transversely therein midway between its ends and opening on its top, said bar being provided with a pair of struts 6, said struts being mounted on the upper side of the bar equi-distant from the recess 5 and firmly secured to said bar.

A second base-bar 7 is provided similar to the bar 4. It is provided, transversely, midway between its ends with a recess 8 opening on its lower side, and extending upwardly through the bar from the middle of the recess is an impaling-member 9, said bar 7 also being provided with a pair of struts 10 disposed equi-distant from said member 9.

The bars are rectilinear and of equal thickness and length as compared with each other, and the space between the struts 6 is approximately the same as the space between the struts 10, and since the bottom and inner walls of the struts of a pair are disposed at right angles to each other their inner walls will be disposed parallel; and the struts of each pair, near their upper ends, are each provided with a thumb-screw 11.

In operation, the bar 7 is laid crosswise upon the bar 4, the recesses of said bars being in register as shown in Fig. 1 of the drawing, the tree is then placed with its end-portion in the area between the four struts with its end engaged by the impaling member 9, and by rotating the screws the latter may enter the body of the tree in a manner to support it in an upright position.

When placing the tree in position as mentioned and before any adjustments have been made by use of the screws, the tree should be moved downward with sufficient force to cause said member 9 to enter the end-portion of the tree, and it will be understood that the screws may be used in a manner to adjust the tree in a suitable upright position. It will be noted that the screws are of adequate length so that trees of small size may be supported as well as those of larger size.

Since the struts are of uniform shape and size they may be manufactured at a nominal cost. It will be seen that any end-thrust of member 9 occasioned by the tree when the latter is forcibly moved downward thereon will be supported by that part of the bar 4 below its recess 5.

It will be appreciated that the device provides a holder which will be convenient in use; also it is of ornamental appearance. When separated the two parts may be disposed side by side and will occupy a very limited space.

It will be noted that nails, screws or other keepers are not needed for securing the bars together for the reason that the weight of the tree will press the bar 7 downwardly upon the lower bar 4 and will operate to maintain the recesses in register.

In order that the screws or bolts 11 may be rotated without undue friction and that stresses may be adequately supported which are directed to the upper ends of the struts, nuts 12 are provided in which the bolts rotate. Suitable apertures are formed in the struts near their upper ends, these being of such size that the bolts may lie loosely therein. Slots 13 are formed in the upper ends of the struts for receiving the nuts 12, and in operation, when a bolt is rotated for moving its sharp end into a tree the stresses are supported by the nuts and the nuts will be supported by the struts.

By referring to Fig. 1 of the drawing it will be seen that the struts which are arranged in pairs are disposed in spaced relation at opposed sides of a recess for receiving a Christmas tree or other object therebetween, and each strut provides a vertical supporting wall continuous from its top to a base-strip, the advantage being that a strong construction is provided for said support.

Numerals 14 indicate keepers which traverse the struts and which engage in a base strip.

I claim as my invention:

In devices for the purpose described, a base-bar having a recess midway between its ends opening on its upper side, a pair of struts mounted on said bar in opposed relation to said recess each strut having a slot opening on its top, a second base-bar having a recess opening on its lower side and adapted to be disposed transversely with its recess disposed in register with the recess of the first named bar, an impaling-pin extending transversely through the second bar from the recess thereof, a second pair of struts mounted on the second bar in opposed relation to said impaling-pin each second strut having a slot opening on its top, a plurality of screws each carried by a strut and traversing a slot thereof, and a plurality of threaded nuts each disposed in a slot and mounted on a screw.

In testimony whereof, I have affixed my signature.

ALBERT O. JENSEN.